(12) United States Patent
Wang

(10) Patent No.: US 9,409,477 B2
(45) Date of Patent: Aug. 9, 2016

(54) TRANSMISSION SYSTEM FOR AN ELECTRIC VEHICLE

(71) Applicant: LOROM INDUSTRIAL CO., LTD., Taipei (TW)

(72) Inventor: Ching-Feng Wang, Taipei (TW)

(73) Assignee: Lorom Industrial Co., Ltd., Taipei (TW)

( * ) Notice: Subject to any disclaimer, the term of this patent is extended or adjusted under 35 U.S.C. 154(b) by 28 days.

(21) Appl. No.: 14/620,350

(22) Filed: Feb. 12, 2015

(65) Prior Publication Data

US 2015/0266373 A1    Sep. 24, 2015

(30) Foreign Application Priority Data

Mar. 24, 2014  (CN) ...................... 2014 2 0134840 U

(51) Int. Cl.
| | |
|---|---|
| *B60K 17/08* | (2006.01) |
| *B62D 37/04* | (2006.01) |
| *B60K 1/00* | (2006.01) |
| *B60K 20/00* | (2006.01) |

(52) U.S. Cl.
CPC . *B60K 17/08* (2013.01); *B60K 1/00* (2013.01); *B60K 20/00* (2013.01); *B62D 37/04* (2013.01); *B60K 2001/001* (2013.01)

(58) Field of Classification Search
CPC .... B60K 17/08; B60K 1/00; B60K 2001/001; B60K 20/00; B60K 17/16; B62D 37/04
See application file for complete search history.

(56) References Cited

U.S. PATENT DOCUMENTS

| | | | | |
|---|---|---|---|---|
| 4,368,796 | A  * | 1/1983 | Patin ................ | B60G 17/01925 180/215 |
| 2012/0165147 | A1* | 6/2012 | Radermacher ........... | B60K 6/48 475/5 |
| 2015/0283889 | A1* | 10/2015 | Agnew ..................... | B60K 1/00 180/292 |

* cited by examiner

*Primary Examiner* — Faye M Fleming
(74) *Attorney, Agent, or Firm* — Rosenberg, Klein & Lee

(57) ABSTRACT

A transmission system for an electric vehicle includes a gearbox which produces different rotation ratio between a drive motor and drive wheels during running of the electric vehicle, a differential which serves to absorb a power of the gearbox to overcome rotation speed difference between the drive wheels, and two wheel axles which are used to deliver the power to the drive wheels from the differential, the gearbox has a housing which is connected to a vehicle frame of the electric vehicle via a universal coupling. When the electric vehicle runs on a bumpy road and makes a turn, the vehicle frame is able to swing up and down and pivot left and right with respect to the gearbox housing, so as to reduce the bounce of the vehicle and dampen the centrifugal force caused tilt or roll of the vehicle, thus improving driving comfort and stability.

10 Claims, 4 Drawing Sheets

TRANSMISSION SYSTEM FOR AN ELECTRIC VEHICLE

BACKGROUND OF THE INVENTION

1. Field of the Invention

The present invention relates to a transmission system, and more particularly to a transmission system for an electric vehicle.

2. Description of the Prior Art

A transmission system of a vehicle (including fuel vehicles and electric vehicles) essentially consists of a gearbox, a differential, a drive shaft and at lease two wheel axles. The transmission system can also be provided with no drive shaft according to different drive modes. The transmission system is used to deliver power from the motor (the engine of a fuel vehicle or a drive motor of an electric vehicle) to the drive wheels, and thus driving the vehicle to move.

Motor and gearbox are normally fixed to the vehicle frame by mounting brackets to restrain the vibration caused by running of the motor or gearbox. However, mounting brackets are only capable of reducing vibration, but unable to counteract the centrifugal force produced during a turn of the vehicle. Once a driver takes a turn too fast and produces a big centrifugal force, the vehicle is very likely to lose balance and starts to slide or roll over.

SUMMARY OF THE INVENTION

The primary objective of the present invention is to provide a transmission system for an electric vehicle, which is capable of dampening bounce, counteracting centrifugal force and improving stability when the vehicle runs on a bumpy road and makes a turn.

To achieve the above objective, a transmission system for an electric vehicle in accordance with the present invention comprises a gearbox which produces different rotation ratio between a drive motor and drive wheels during running of the electric vehicle, a differential which serves to absorb a power of the gearbox to overcome rotation speed difference between the drive wheels, and two wheel axles which are used to deliver the power to the drive wheels from the differential, the gearbox has a housing which is connected to a vehicle frame of the electric vehicle via a universal coupling, when the electric vehicle runs on a bumpy road and makes a turn, the vehicle frame is able to swing up and down and pivot left and right with respect to the gearbox housing.

The universal coupling comprises a connecting member which includes a fork portion and a neck portion formed above the fork portion, the fork portion is sleeved onto a coupling member on a top of the housing and fixed thereto by a fastener which is inserted through the coupling member and the fork portion; a bearing which is mounted on the neck portion of the connecting member; a bracket which includes a bottom plate and a lateral plate, the bottom board includes a bearing hole for holding of the bearing, and the lateral plate is connected to the vehicle frame; and a bolt which is inserted through the bearing and screwed into the neck portion of the connecting member, so that the bracket is fixed to the connecting member, and the bearing is retained in the bearing hole of the bracket.

The advantage of the present invention over the prior art is that with the universal coupling connected between the gearbox housing and the vehicle frame, when the vehicle runs on a bumpy road and makes a turn, the vehicle frame is able to sway up and down and rotate left and right with respect to the gearbox housing, so as to reduce the bounce of the vehicle or dampen the centrifugal force caused tilt or roll of the vehicle, thus improving driving comfort and stability.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
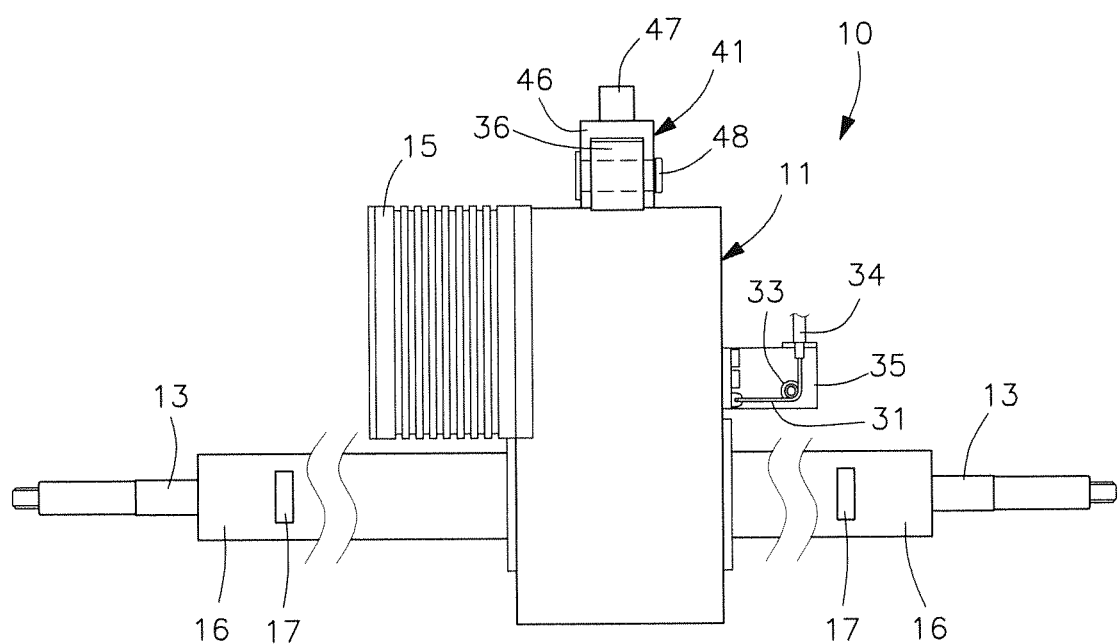
FIG. 1 is a front view of a transmission system for an electric vehicle in accordance with the present invention.
Figure 2:
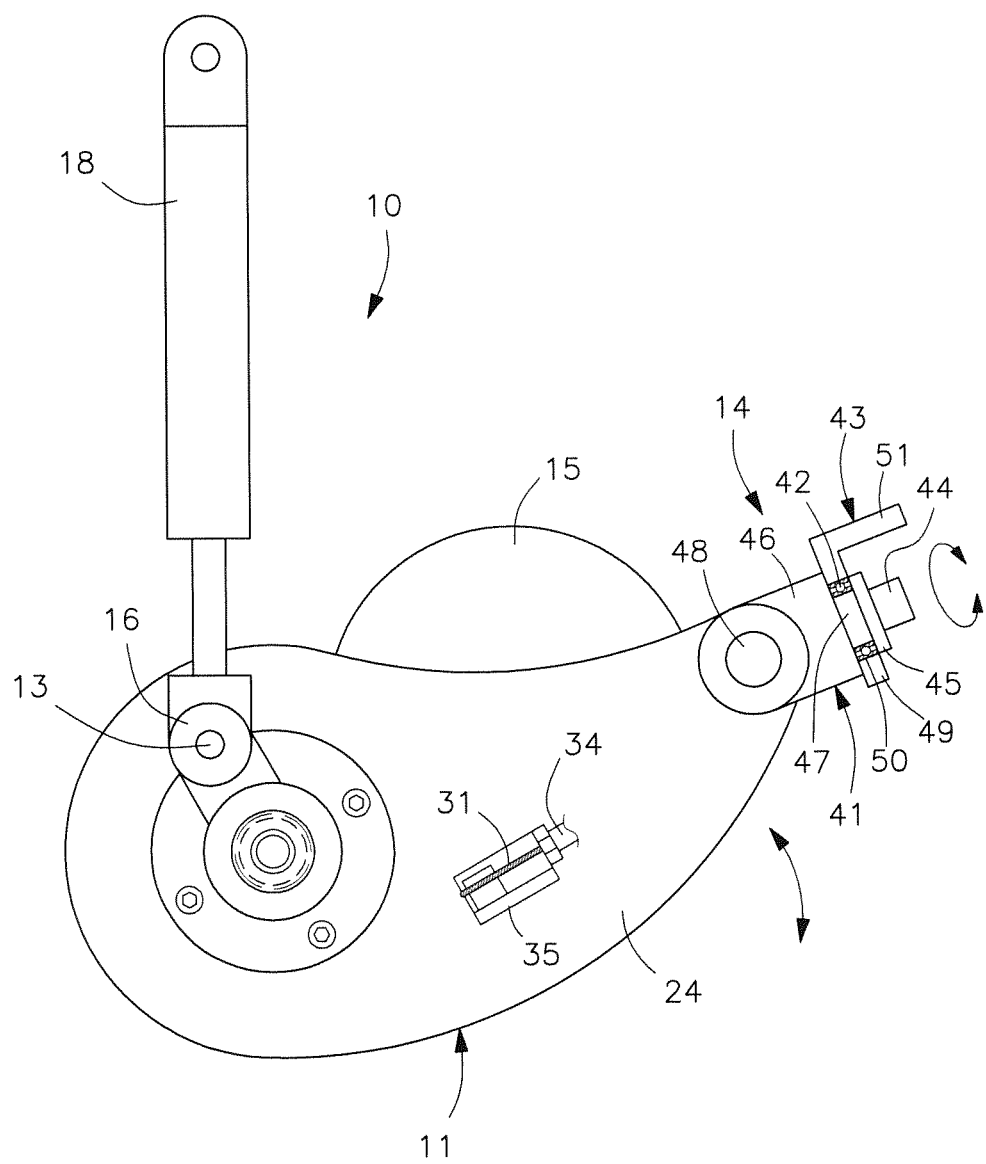
FIG. 2 is a side view of the transmission system for an electric vehicle in accordance with the present invention.
Figure 3:
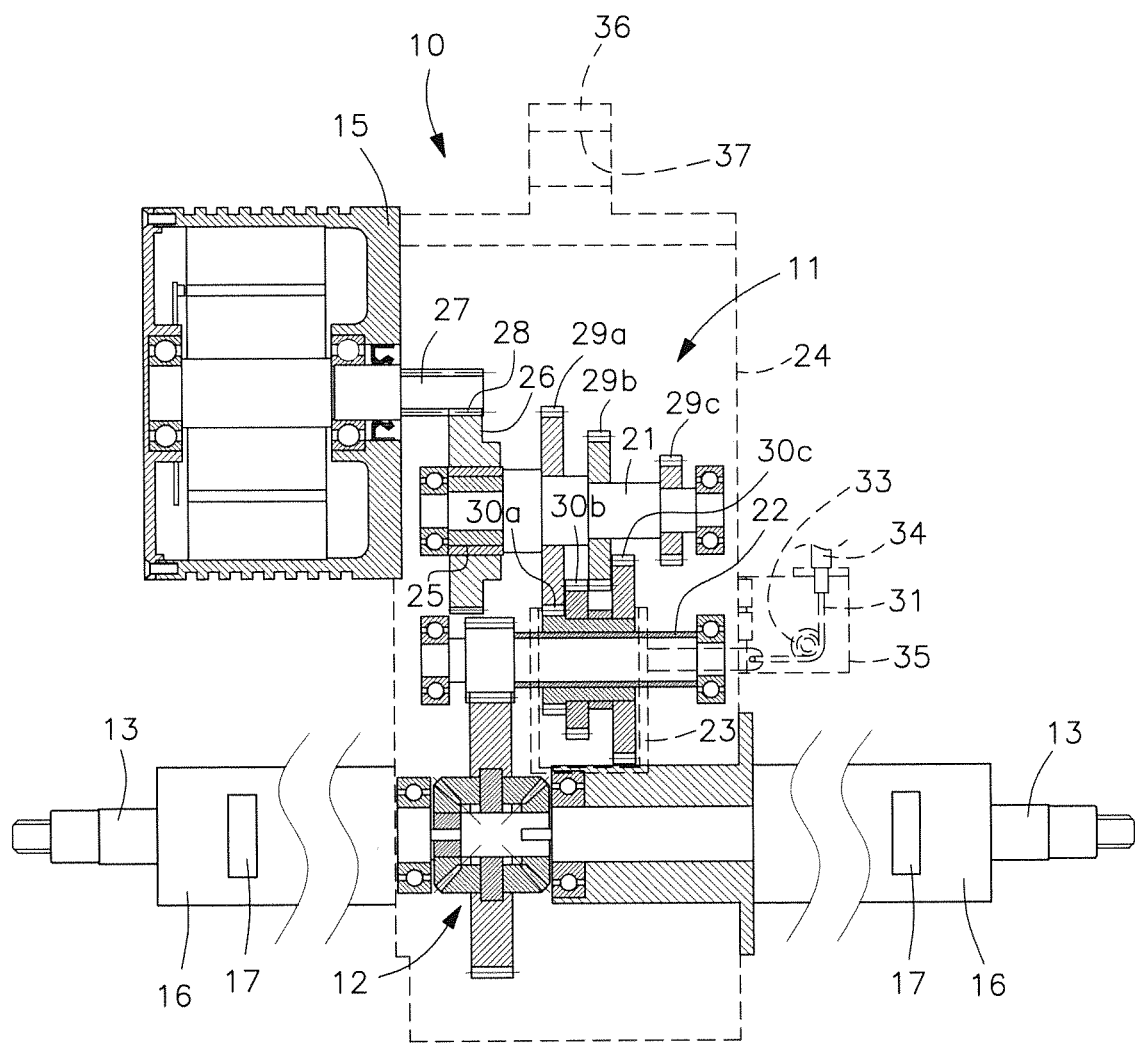
FIG. 3 is a front cross sectional view of the transmission system for an electric vehicle in accordance with the present invention.

Referring to FIGS. 1-3, a transmission system 10 for an electric vehicle in accordance with the present invention comprises a gearbox 11, a differential 12 and two wheel axles 13.

Figure 4:
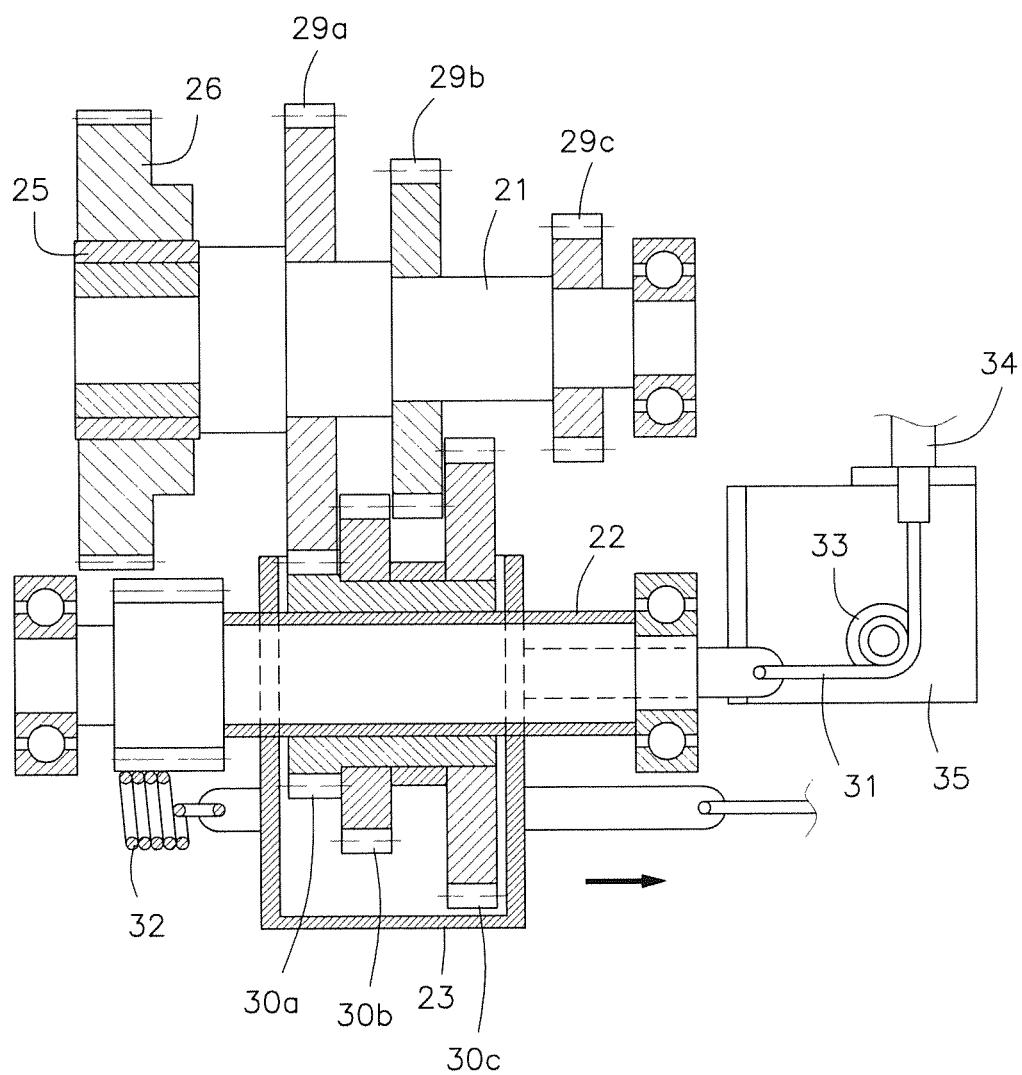
FIG. 4 is a cross sectional view of a gearbox of the transmission system for an electric vehicle in accordance with the present invention.

The gearbox 11 is used to produce different rotation ratio between a drive motor 15 and drive wheels (not shown) of an electric vehicle. The gearbox 11 includes an input shaft 21, an output shaft 22 and a shift slide 23 which are all disposed in a housing 24. The input shaft 21 is connected to a force input gear 26 via a unilateral bearing 25. The force input gear 26 is engaged with a force output gear 28 mounted on a main shaft 27 of the drive motor 15, so that rotation can be transmitted from the main shaft 27 to the input shaft 21 in a one-way manner, which prevents force transmission in a reverse direction. An engine normally should possess the function of engine brake, therefore, the unidirectional bearing is unable to take the place of the clutch of an engine. However, the electric vehicle is driven by a drive motor and uses the unidirectional bearing to replace the clutch, which not only reduces cost, allows for easy shifting, but also prevents the potential risk caused by back electromotive force produced when the electric vehicle runs down a slope fast. Any functionally equivalent unidirectional transmission device is applicable and not limited to the unidirectional bearing. Besides, a plurality of drive gears 29*a*, 29*b* and 29*c* are provided in size order on the input shaft 21, and the output shaft 22 is also correspondingly provided with a plurality of differential gears 30*a*, 30*b* and 30*c*. The shift slide 23 has one side connected to a shift wire 31, and another side connected to one end of a tension spring 32 (as shown in FIG. 4). Another end of the tension spring 32 is fixed, so that the tension spring 32 serves as a power source for moving the shift slide 23 and the differential gears 30*a*, 30*b* and 30*c* back to a desired position. The shift wire 31 has one end wound around a fixed pulley 33 and connected to a shift head 34. The fixed pulley 33 is rotatably disposed in a shift box 35. By such arrangements, when the shift head 34 is operated to pull the shift wire 31 winding around the fixed pulley 33, the shift slide 23 will be caused to push one of the differential gears 30*a*, 30*b* and 30*c* to a desired position to engage with a corresponding one of the drive gears 29*a*, 29*b* and 29*c*, which creates different gear ratios (or transmission ratio or drive ratio) to deliver the rotation power of the drive motor 15 to the wheels of the vehicle at different rotation speeds and torques via the differential 12 and the wheel axles 13.

The differential 12 serves to absorb the power of the output shaft 22 to overcome the rotation speed difference between the drive wheels, so that, when the vehicle move in a curved path, the inner and outer wheels of the vehicle are allowed to rotate at different speeds.

The wheel axles 13 are used to deliver the power to the drive wheels from the differential 12. Since the vehicle of a FF (front motor front wheel drive), RR (rear motor rear wheel drive) or MR (middle motor rear wheel drive) type is not equipped with a drive shaft, wherein the gearbox 11 and the differential 12 are directly connected to the wheel axles 13 after the power is outputted. Namely, as shown in FIG. 3, the drive motor 15, the gearbox 11 and the differential 12 are connected together, and then two wheel axels 13 are connected at left and right sides of the differential 12 to deliver power to two drive wheels at left and right sides of the vehicle. A sleeve 16 of each of the wheel axles 13 is formed with an assembly hole 17 for assembling of a shock absorber 18 which has an upper end connected to a vehicle frame (not shown) to absorb or reduce vibration caused in a vertical direction when the vehicle moves on a bumpy road.

During the operation of the transmission system 10, the gearbox 11 is manually operated to move the differential gears 30a, 30b and 30c into a desired position. In other words, the shift head 34 is manually operated to move the shift slide 23 to the desired position via the shift wire 31, meanwhile, the differential gears 30a, 30b and 30c move synchronously with the shift slide 23 until one of the differential gears 30a, 30b and 30c engages with a corresponding one of the drive gears 29a, 29b and 29c to create a desired gear ratio. Then, the power of the output shaft 22 is distributed by the differential 12 and delivered to the drive wheels by the left and right wheel axles 13 to make the vehicle move.

Referring then to FIGS. 3 and 4, the differential gear 30a is engaged with the drive gear 29a, at this moment, the speed position of the transmission system 10 is defined as a third speed position. Similarly, when the differential gears 30b and 30c are engaged with the drive gears 29b and 29c respectively, the speed positions of the transmission system 10 are defined as a second speed position and a first speed position, respectively. When the transmission system 10 is downshifted from the third speed position to the second speed position to the first speed position, the tension spring 32 will be stretched to provide an elastic force which serves as a power source to push the gears into a desired speed position during upshifting. In other words, when upshifting from 1 to 2 to 3 speed position, the shift slide 23 and the differential gears 30a, 30b and 30c can be pushed by the tension spring 32 to the desired position.

It is to be noted that the transmission system 10 of the present invention is designed to be used in small electric vehicles, such as three-wheel vehicle or other small electric vehicles, therefore, the gearbox 11 is equipped with forward gears only but has no reversal gear.

Since the transmission system 10 of the present invention requires no use of the clutch which is used on a conventional transmission to deliver the power to the manual gearbox from the engine, which ensures a smooth shift and allows a user who is not good at manual transmission to drive easily. Besides, the transmission system 10 without the clutch has a simple structure, and low manufacturing and maintenance costs.

In addition, a FR (front motor rear wheel drive) vehicle or a front motor four-wheel drive vehicle uses the rear wheels as drive wheels, therefore, the power from the gearbox must be transmitted to the differential of the rear wheels via the drive shaft, and then transmitted to the rear wheels. In other words, the transmission system 10 of the present invention can also include a gearbox 11, a drive shaft (not shown), a differential 12 and at least two wheel axles 13, and the embodiment as shown in the drawings are exemplary only, and not intended to limit the present invention.

In order to dampen the bounce of the vehicle when moving on bumpy road, or the centrifugal force caused tilt or roll of the vehicle when making a turn, the gearbox 11 of the present invention as shown in FIGS. 1 and 2 is connected to the vehicle frame (not shown) via a universal coupling 14 which includes a connecting member 41, a bearing 42, a bracket 43 and a bolt 44. The connecting member 41 includes a fork portion 46 and a neck portion 47 formed above the fork portion 46. The fork portion 46 is a reverse U-shaped structure sleeved onto a coupling member 36 on the top of the gearbox housing 24 and fixed thereto by a fastener 48, such as pin or rivet inserted through the fork portion 46 and a fixing hole 37 (as shown in FIG. 3) which is formed in the coupling member 36, which allows the connecting member 41 to pivot with respect to the housing 24. The bearing 42 is mounted on the neck portion 47 of the connecting member 41 to allow rotation of the bracket 43. The bracket 43 includes a bottom plate 49 and a lateral plate 51 connected to the bottom plate 49 to form an L-shaped structure. The bottom plate 49 includes a bearing hole 50 for holding of the bearing 42, and the lateral plate 51 is connected to the vehicle frame. When the connecting member 41, the bearing 42 and the bracket 43 are assembled, the bolt 44 is inserted through a washer 45 disposed on the bottom plate 49 and the bearing 42 and screwed into the neck portion 47 of the connecting member 41, so that the bracket 43 is fixed to the connecting member 41, and the bearing 42 is retained in the bearing hole 50 of the bracket 43 to allow for rotation of the connecting member 41 and the bracket 43. With the universal coupling 14 connected between the gearbox housing 24 and the vehicle frame, when the vehicle runs on a bumpy road and makes a turn, the vehicle frame is able to sway up and down and rotate left and right with respect to the gearbox housing 24, so as to reduce the bounce of the vehicle and dampen the centrifugal force caused tilt or roll of the vehicle, thus improving driving comfort and stability.

The universal coupling 14 and the shock absorbers 18 connect the transmission system 10 to the vehicle frame, so as to form a three point support. Besides, the drive motor 15, the gearbox 11, the differential 12, the wheel axles 13, the sleeves 16 and the shock absorbers 18 can be modularly designed to reduce the manufacturing efficiency of the vehicle while reducing manufacturing cost.

While we have shown and described various embodiments in accordance with the present invention, it is clear to those skilled in the art that further embodiments may be made without departing from the scope of the present invention.

What is claimed is:

1. A transmission system for an electric vehicle comprising a gearbox which produces different rotation ratio between a drive motor and drive wheels during running of the electric vehicle, a differential which serves to absorb a power of the gearbox to overcome rotation speed difference between the drive wheels, and two wheel axles which are used to deliver the power to the drive wheels from the differential, the gearbox has a housing which is connected to a vehicle frame of the electric vehicle via a universal coupling, the universal coupling comprises:

a connecting member which includes a fork portion and a neck portion formed above the fork portion, the fork portion is sleeved onto a coupling member on a top of the housing and fixed thereto by a fastener which is inserted through the coupling member and the fork portion;

a bearing which is mounted on the neck portion of the connecting member;

a bracket which includes a bottom plate and a lateral plate, the bottom plate includes a bearing hole for holding of the bearing, and the lateral plate is connected to the vehicle frame; and a bolt which is inserted through the bearing and screwed into the neck portion of the connecting member, so that the bracket is fixed to the connecting member, and the bearing is retained in the bearing hole of the bracket.

2. The transmission system for the electric vehicle as claimed in claim 1, wherein a sleeve of each of the wheel axles is connected to the vehicle frame from a shock absorber.

3. The transmission system for the electric vehicle as claimed in claim 1, wherein the gearbox includes an input shaft, an output shaft and a shift slide, a plurality of drive gears is provided on the input shaft, and the output shaft is also correspondingly provided with a plurality of differential gears, the shift slide is connected to a shift wire, then the shift wire winds around a fixed pulley and is connected to a shift head, when the shift head is manually operated, the shift slide will be pulled by the shift wire to move synchronously with the differential gears to a desired position where one of the differential gears will engage with a corresponding one of the drive gears, so as to create a desired gear ratio.

4. The transmission system for the electric vehicle as claimed in claim 3, wherein the input shaft is connected to a force input gear via a unilateral bearing, the force input gear is engaged with a force output gear mounted on a main shaft of the drive motor, so that rotation is transmitted from the main shaft to the input shaft in a one-way manner.

5. The transmission system for the electric vehicle as claimed in claim 3, wherein a tension spring is used as a power source to push the shift slide and the differential gears back to a desired position during shifting in a reverse direction.

6. A transmission system for an electric vehicle comprising a gearbox which produces different rotation ratio between a drive motor and drive wheels during running of the electric vehicle, a transmission shaft which delivers a power from the gearbox, a differential which serves to absorb the power from the gearbox to overcome rotation speed difference between the drive wheels, and at least two wheel axles which are used to deliver the power to the drive wheels from the differential, the gearbox has a housing which is connected to a vehicle frame of the electric vehicle via a universal coupling, the universal coupling comprises:

a connecting member which includes a fork portion and a neck portion formed above the fork portion, the fork portion is sleeved onto a coupling member on a top of the housing and fixed thereto by a fastener which is inserted through the coupling member and the fork portion;

a bearing which is mounted on the neck portion of the connecting member;

a bracket which includes a bottom plate and a lateral plate, the bottom plate includes a bearing hole for holding of the bearing, and the lateral plate is connected to the vehicle frame; and a bolt which is inserted through the bearing and screwed into the neck portion of the connecting member, so that the bracket is fixed to the connecting member, and the bearing is retained in the bearing hole of the bracket.

7. The transmission system for the electric vehicle as claimed in claim 6, wherein a sleeve of each of the wheel axles is connected to the vehicle frame from a shock absorber.

8. The transmission system for the electric vehicle as claimed in claim 6, wherein the gearbox includes an input shaft, an output shaft and a shift slide, a plurality of drive gears is provided on the input shaft, and the output shaft is also correspondingly provided with a plurality of differential gears, the shift slide is connected to a shift wire, then the shift wire winds around a fixed pulley and is connected to a shift head, when the shift head is manually operated, the shift slide will be pulled by the shift wire to move synchronously with the differential gears to a desired position where one of the differential gears will engage with a corresponding one of the drive gears, so as to create a desired gear ratio.

9. The transmission system for the electric vehicle as claimed in claim 8, wherein the input shaft is connected to a force input gear via a unilateral bearing, the force input gear is engaged with a force output gear mounted on a main shaft of the drive motor, so that rotation is transmitted from the main shaft to the input shaft in a one-way manner.

10. The transmission system for the electric vehicle as claimed in claim 8, wherein a tension spring is used as a power source to push the shift slide and the differential gears back to a desired position during shifting in a reverse direction.

* * * * *